3,188,339
THIOPYROPHOSPHONATE ESTERS AND PROCESS FOR MAKING SAME

Ludwig Maier, University City, Mo., assignor to Monsanto Company, a corporation of Delaware
No Drawing. Filed Sept. 7, 1960, Ser. No. 54,369
Claims priority, application Switzerland, Sept. 9, 1959, 78,044/59
8 Claims. (Cl. 260—461)

The present invention relates to a process for the manufacture of thiopyrophosphorus derivatives having the following formula

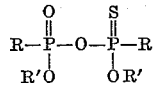

wherein R and R' are aliphatic hydrocarbon radicals, preferably having not more than 5 carbon atoms, which can be identical or different. The previous unknown new compounds are obtained by reacting phosphites of the formula $R(R'O)P(O)H$ wherein R and R' are aliphatic hydrocarbon radicals with sulfur dichloride or a dialkylamino-sulfenic chloride. The reaction is preferably carried out in an inert solvent like, for example, petrol ether, benzene, etc., at temperatures of about 5–40° in such a manner, that is added gradually the phosphite to the sulfur dichloride, or the dialkylaminosulfenic chloride to the phosphite. In the first case, the acid binding agent, for example, pyridine, dimethylaniline etc., may be added when the reaction is finished, but eventually the reaction proceeds also without it. In the second case an acid binding agent is not necessary.

In the German Patent No. 820,001 there are reported O-tetraalkylthiopyrophosphoric acids. In contrast, the compounds of this invention show only two radicals joined by oxygen, while further two radicals are attached directly to the phosphorus atoms. These compounds are more stable and display surprisingly a yet stronger contact insecticide activity, being especially active against yellow fever mosquito larvae, *Aedes aegypti*, and two-spotted spider mites, *Tetranychus telarius*, at concentrations below 1%.

Example 1

To a solution of 40 g. O-ethyl-methylphosphite in 100 ml of light petroleum is added gradually with stirring at 10° C. a solution of 12 g. of sulfur dichloride in 100 ml. of light petroleum. Then, during a period of about 1 hour are added 18.5 g. of pyridine. After filtering off the salts and fractional distillation, an almost colorless oil is obtained that consists to the main part of 0,0 ethyl-dimethylmonothiopyrophosphonate, $C_2H_5O(CH_3)P(O)$-O-$(S)P(CH_3)OC_2H_5$; B.P. 36–37° C./0.02 mm. The structure of this compound was proved by nuclear magnetic resonance spectroscopy.

Analysis:

|  | Calcd. | Found |
|---|---|---|
| Percent C | 29.27 | 29.72 |
| Percent H | 6.55 | 5.80 |

In similar manner there are received the following analogues:

$CH_3O(C_2H_5)P(O)$-O-$(S)P(C_2H_5)OCH_3$
iso-$C_3H_7O(CH_3)P(O)$-O-$(S)P(CH_3)$iso-$OC_3H_7$
iso-$C_4H_9O(CH_3)P(O)$-O-$(S)P(CH_3)$iso-$OC_4H_9$
n-$C_4H_9O(CH_3)P(O)$-O-$(S)P(CH_3)$n-$OC_4H_9$
iso-$C_3H_7O(C_2H_5)P(O)$-O-$(S)P(C_2H_5)$iso-$OC_3H_7$
iso-$C_3H_7O(Allyl)P(O)$-O-$(S)P(Allyl)$iso-$OC_3H_7$ The new products of the invention are generally applied for insecticidal use in the form of sprays and aerosols. Useful sprays may be prepared by dispersing the present products in water with the aid of a wetting agent, to prepare aqueous dispersions which may be employed as sprays; in other procedures, the products may be applied to mite and insect hosts as oil-in-water emulsion sprays. The new products may also be dissolved in liquified gases, such as fluorochloroethanes or methyl chloride, and applied to plants, etc., from aerosol bombs. Instead of employing liquids as carriers and diluents, insecticidal dusts which contain the new compounds as active ingredients may be prepared, e.g., by incorporating the active compound with a solid carrier such as talc, bentonite, fuller's earth, etc.

Although the invention has been described in terms of specified embodiments which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:
1. A process for the preparation of a thiopyrophosphorus compound having the formula

$$R(R'O)P(O)O(S)P(R'O)R$$

wherein R and R' are aliphatic hydrocarbons, which comprises reacting a compound of the formula $$R(R'O)P(O)H$$

wherein R and R' are defined as above, with a reagent selected from the group consisting of sulfur dichloride and dialkylaminosulfenic chloride and an acid binding agent is added to react with the hydrogen chloride formed when sulfur dichloride is a reactant.

2. A process according to claim 1 where R and R' are aliphatic hydrocarbons having at maximum 5 carbon atoms.

3. A process of claim 1 wherein the reagent is sulfur dichloride and said acid binding agent is an amine.

4. A process according to claim 2 where R and R' are alkyl having not more than 5 carbon atoms.

5. A process of claim 2 wherein R is alkenyl having not more than 5 carbon atoms and R' is alkyl having not more than 5 carbon atoms.

6. A process of claim 3 wherein said amine is pyridine.

7. A process of claim 6 wherein R is methyl and R' is ethyl.

8. Iso-$C_3H_7O(Allyl)P(O)$-O-$(S)P(Allyl)$iso-$OC_3H_7$.

References Cited by the Examiner

UNITED STATES PATENTS

| | | | |
|---|---|---|---|
| 2,632,768 | 3/53 | Coover et al. | 260—461 |
| 2,944,075 | 7/60 | Debo | 260—461 |
| 2,951,088 | 8/60 | Debo | 260—461 |
| 2,952,701 | 9/60 | McConnell et al. | 260—461 |
| 2,957,931 | 10/60 | Hamilton et al. | 260—461 |
| 2,965,666 | 12/60 | Debo | 260—461 |
| 3,014,944 | 12/61 | Birum | 260—461 |

FOREIGN PATENTS 588,687 11/60 Belgium.
996,794 12/51 France.

OTHER REFERENCES

Coe et al., J. Chem. Soc. (London), 1957, 3604–3607.

CHARLES B. PARKER, *Primary Examiner.*
ABRAHAM H. WINKELSTEIN, MORRIS LIEBMAN, *Examiners.*